(12) United States Patent
Bae et al.

(10) Patent No.: US 6,424,104 B1
(45) Date of Patent: Jul. 23, 2002

(54) COLOR CRT AND DRIVING METHOD OF THE SAME

(75) Inventors: Min-cheol Bae; Yong-geol Kwon, both of Suwon (KR)

(73) Assignee: Samsung SDI Co., Ltd., Kyungki-Do (KR)

( * ) Notice: Subject to any disclaimer, the term of this patent is extended or adjusted under 35 U.S.C. 154(b) by 0 days.

(21) Appl. No.: 09/885,014

(22) Filed: Jun. 21, 2001

(30) Foreign Application Priority Data

Aug. 22, 2000 (KR) ........................................ 2000-48542

(51) Int. Cl.[7] ................................................ H01J 29/50
(52) U.S. Cl. ........................ 315/382; 313/414; 313/449
(58) Field of Search ................................ 315/399, 382, 315/382.1, 368.15; 313/413–415, 409, 449, 467

(56) References Cited

U.S. PATENT DOCUMENTS 6,166,483 A * 12/2000 Chen et al. .................. 313/414
6,225,765 B1 * 5/2001 Yatsu et al. .................. 315/382

* cited by examiner

*Primary Examiner*—Don Wong
*Assistant Examiner*—Wilson Lee
(74) *Attorney, Agent, or Firm*—Leydig, Voit & Mayer, Ltd.

(57) ABSTRACT

A color CRT is driven by focusing and accelerating an electron beam emitted from a cathode by forming electron lenses including a quadrupole lens by applying a predetermined voltage to the cathode of an electron gun installed in a neck portion of a funnel and each of electrodes, focusing the electron beam on a fluorescent film by applying a voltage having a horizontal dynamic waveform having a ratio of slopes of 6.85 or more between a unilateral area of 90% and a unilateral area of 50% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film and excite the fluorescent film. Thus, resolution of the overall screen is increased.

14 Claims, 18 Drawing Sheets

CORNER OF SCREEN

LEFT AND RIGHT SIDES OF SCREEN

UPSIDE AND DOWNSIDE
OF SCREEN

CENTRAL PORTION OF SCREEN

CORNER OF SCREEN

LEFT AND RIGHT SIDES
OF SCREEN

UPSIDE AND DOWNSIDE
OF SCREEN

CENTRAL PORTION OF SCREEN

CENTRAL PORTION OF SCREEN

POINT OF 50% OF SCREEN
HORIZONTAL DIRECTION

STATE OF DEFOCUSING OF SCREEN
(HATCHED PORTION)

CENTER OF SCREEN

POINT OF 50% OF SCREEN
HORIZONTAL DIRECTION

COLOR CRT AND DRIVING METHOD OF THE SAME

BACKGROUND OF THE INVENTION

1. Field of the Invention

The present invention relates to a color cathode ray tube (CRT), and more particularly, to a color CRT for correcting distortion of a profile of an electron beam according to an increase of a deflection angle of the electron beam emitted from an electron gun, and to a driving method of the same.

2. Description of the Related Art

A typical color CRT is shown in FIG. 1. As shown in the drawing, a color CRT includes a panel 12 having a fluorescent film 11 formed an inner surface thereof, a shadow mask frame assembly 13 installed inside the panel 12 and including a shadow mask 13a having a color selection function of an electron beam with respect to fluorescent substances of three colors and a frame 13b supporting the shadow mask 13a, a funnel 14 sealed to the panel 12, an electron gun 20 for installed inside a neck portion 14a of the funnel 14 forming a seal, and a deflection yoke 15 installed at a cone portion of the funnel 14 for deflecting an electron beam emitted from the electron gun 20.

In the color CRT having the above structure, as a predetermined electric potential is applied to the electron gun 20, an electron beam emitted from the electron gun 20 is selectively deflected according to the position of scanning and excites fluorescent substances so that an image is formed.

In the above color CRT, an electron beam does not accurately land on a fluorescent point of a fluorescent film at the peripheral portion of a screen surface due to lowering of a focus property caused by making a screen surface flat and a wide deflection angle. That is, as shown in FIG. 2, when a deflection angle of an electron beam increases (from 102° to 120°) and a screen has a predetermined curvature, distortion of a spot S1 of an electron beam B1 is not severe at the peripheral portion of the screen. However, in the case of a flat screen, an incident angle of an electron beam B2 scanned onto the peripheral portion of the screen decreases so that the electron beam is distorted and a spot S2 increases. Also, when the deflection angle increases as described above, since densities of a pincushion magnetic field (MP) and a barrel magnetic field (MB) increase at the peripheral portion of an area where an irregular magnetic field is formed by a deflection yoke, as shown FIG. 3, an electron beam is severely distorted. As shown in FIG. 4, since the overall length of a CRT 10b having a relatively small deflection angle is shorter than that of a CRT 10a having a relatively large deflection angle, a difference in length of focusing at the central portion of a screen and the peripheral portion thereof increases. The difference in the length of focus makes the profile of an electron beam landing at the central portion and peripheral portion of the screen large.

According to a conventional technology to solve the above problem, at least one quadrupole lens is adopted in an electron gun in the CRT and a dynamic focus voltage synchronized with a deflection signal is applied to one of electrodes forming the quadrupole lens. Thus, the magnification of the quadrupole lens and the shape of the profile of an electron beam are changed, and simultaneously, a difference in voltage between an electrode forming the quadrupole lens and another electrode forming an electron lens installed adjacent to the electrode is reduced, so that the length of focus is changed.

However, the above methods of correcting the profile of an electron beam by using the quadrupole lens and adjusting the length of focus by changing the magnification of the electron lenses are not able to sufficiently correct distortion due to the distortion of the profile according to an increase of the deflection angle and the irregular magnetic field of the deflection yoke.

In particular, in the case of an electron gun forming at least one quadrupole lens, the shape of a waveform of a dynamic voltage fitting into a quadratic equation is substantially not useful because application of the dynamic voltage applied to the electrode forming the quadrupole lens of the electron gun in an area other than a raster area where a video signal of an image is applied does not affect at all a surface of the image. Thus, since a dynamic parabolic voltage is effective only in the raster area to which the video signal of an image is applied, the shape of a dynamic waveform of a screen should be considered by assuming that the raster area makes 100%.

When the shape P1 of the dynamic horizontal voltage is fitted into a quadratic equation in the raster area as shown in FIG. 5, since a voltage lower than a necessary voltage is applied at the central portion of a screen, a halo phenomenon in which the profile of an electron beam landing at the central portion of the screen is vertically crushed is generated. If the voltage is raised by moving the center of the horizontal voltage waveform upward as shown in FIG. 13, to remove the halo phenomenon, a parabolic voltage in a horizontal direction which is much higher than a necessary voltage is applied at the central portion of the screen. Thus, the profile of the electron beam is vertically elongated as much as the difference between the necessary voltage and the actually applied voltage. When the elongated electron beam is deflected by an irregular magnetic field of the deflection yoke toward the peripheral portion of the screen, the electron beam receives a divergent force in a horizontal direction, considerably lowering resolution of a screen. As shown in FIGS. 5 and 13, a rapid increase in the applied voltage in the outer area of a screen results in a rapid increase in the voltage in an area other than the screen, so that reliability of a high voltage circuit is lowered.

When the waveform is formed according to a quadratic equation, the horizontal dynamic parabolic voltage has a ratio of 1.8 between a slope in a unilateral area of 90% of the raster signal and a slope in a unilateral area of 50% thereof. Thus, since the difference from a fitting trace of an electron beam having a sharp slope at the peripheral portion of a screen surface according to an increase in a deflection angle increases, the electron beam does not accurately land on a fluorescent point of the fluorescent film.

SUMMARY OF THE INVENTION

To solve the above problems, it is an object of the present invention to provide a color CRT which can prevent lowering of a focusing property of an electron beam due to distortion in the profile of the electron beam and a change in the length of focus according to an increase of a deflection angle of the electron beam by the deflection yoke, and a driving method of the same.

Accordingly, to achieve the above object, there is provided a color CRT comprising a panel having a screen surface on which a fluorescent film is formed in a predetermined pattern, a funnel sealed to the panel, an electron gun installed at a neck portion of the funnel and having electrodes for forming at least one quadrupole lens, and a deflection yoke installed throughout the neck portion and a cone portion of the CRT, and a dynamic voltage waveform having a ratio of slopes of 6.85 or more between a unilateral area of 90% and a unilateral area of 50% of a raster area to which a video signal of an image is applied, is applied to at least one electrode forming the quadrupole lens.

It is preferred in the present invention that the horizontal dynamic parabola voltage waveform is applied to at least one of electrodes forming the quadrupole lens of the electron gun.

It is preferred in the present invention that the inclination of a voltage relatively decreases in a unilateral area of 90% or more of the raster area to which a video signal of an image is applied.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of slopes of 6.85 or more between a unilateral area of 90% and a unilateral area of 50% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

It is preferred in the present invention that a voltage in which the inclination of a horizontal dynamic waveform relatively decreases in a unilateral area of 90% or more of the raster area to which a video signal of an image is applied, is applied.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of voltage amounts of 7.14 or more between a unilateral area of 90% and a unilateral area of 50% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of voltage amounts of 33.4 or more between a unilateral area of 90% and a unilateral area of 25% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of voltage amounts of 4.78 or more between a unilateral area of 50% and a unilateral area of 25% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of slopes of 19.5 or more between a unilateral area of 90% and a unilateral area of 25% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

Alternatively, to achieve the above object, there is provided a driving method of a color CRT comprising the steps of focusing and accelerating an electron beam emitted from a cathode by forming a plurality of electron lens including a quadrupole lens by applying a predetermined voltage to the cathode of an electron gun installed at a neck portion of a funnel and each of electrodes, focusing the electron beam on a fluorescent film by applying a voltage having a horizontal dynamic waveform having a ratio of slopes of 2.87 or more between a unilateral area of 90% and a unilateral area of 25% of a raster area to which a video signal of an image is applied, to at least one of the electrodes forming the quadrupole lens, synchronized with a horizontal deflection signal of a deflection yoke installed at a cone portion of the funnel, in order to deflect an electron beam emitted from the electron gun and scan the deflected electron beam onto the fluorescent film of a panel sealed to the funnel, and forming an image by having the deflected electron beam land on the fluorescent film to excite fluorescent substance.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
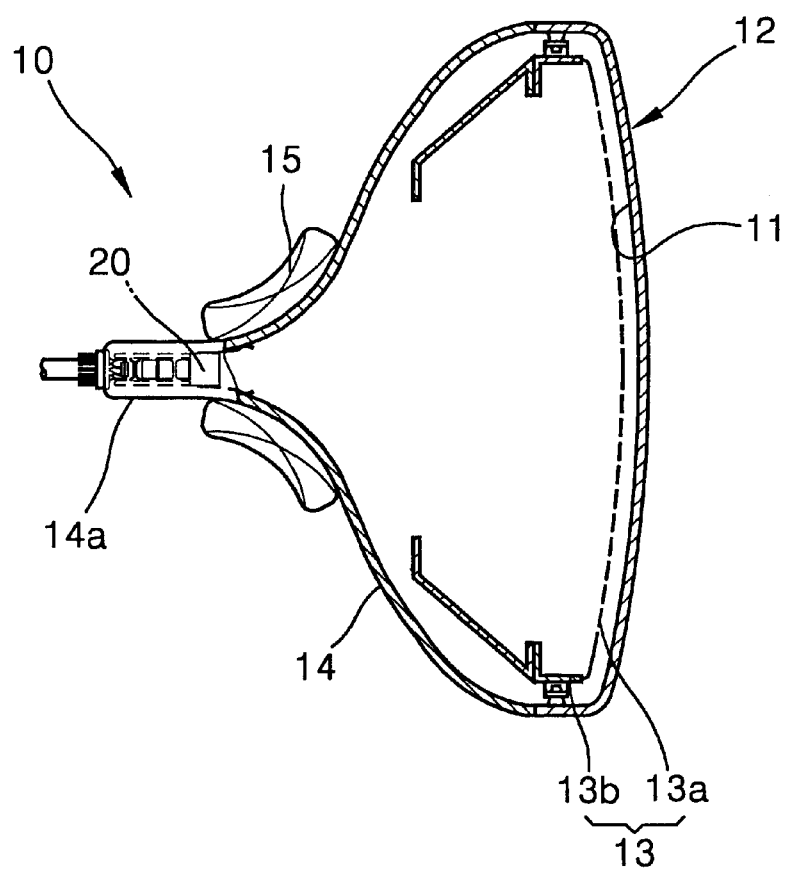
FIG. 1 is a sectional view of a conventional color CRT.
Figure 2:
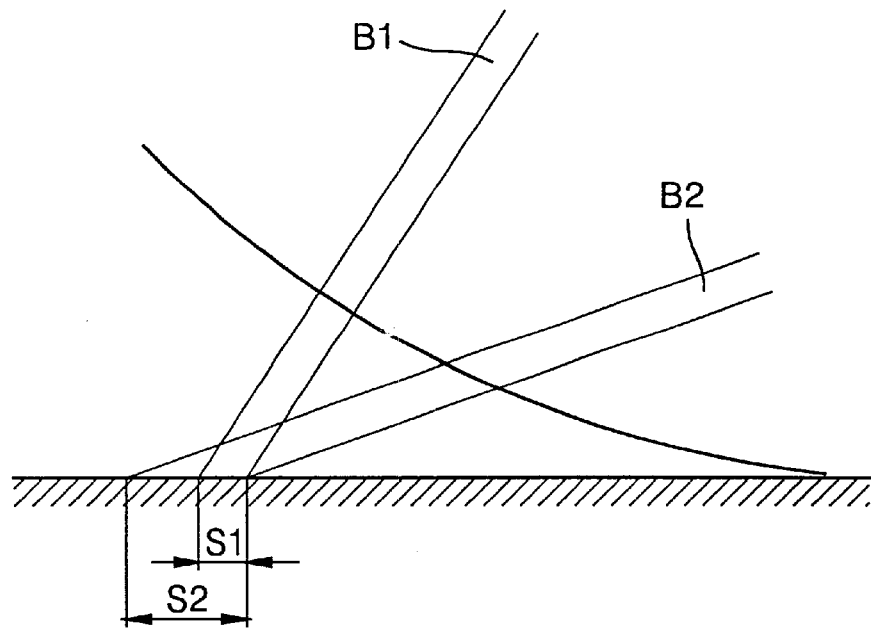
FIG. 2 is a view showing the state in which electron beams having different defection angles land on a screen having a curvature and a flat screen.
Figure 3:
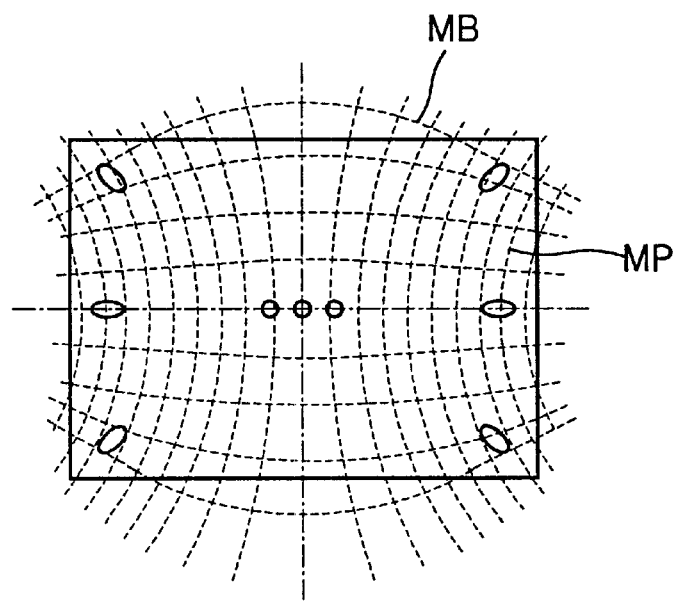
FIG. 3 is a view showing the state of distortion of an electron beam due to an irregular magnetic field of the deflection yoke.
Figure 4:
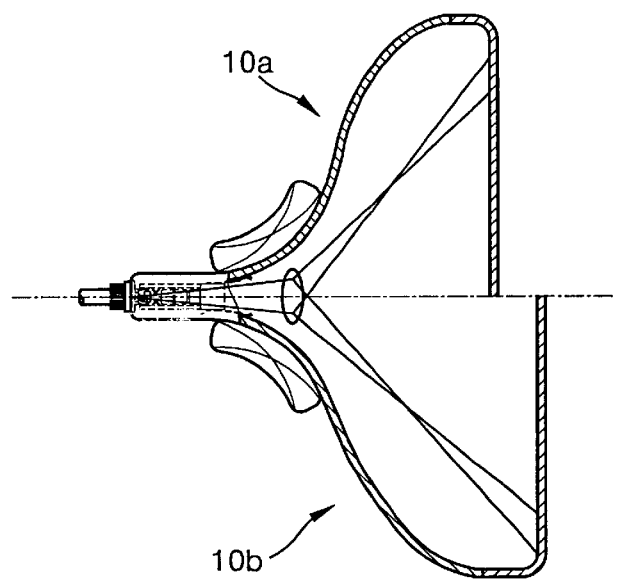
FIG. 4 is a view showing the relationship between the deflection angle of the deflection yoke and the overall length of the CRT.
Figure 5:
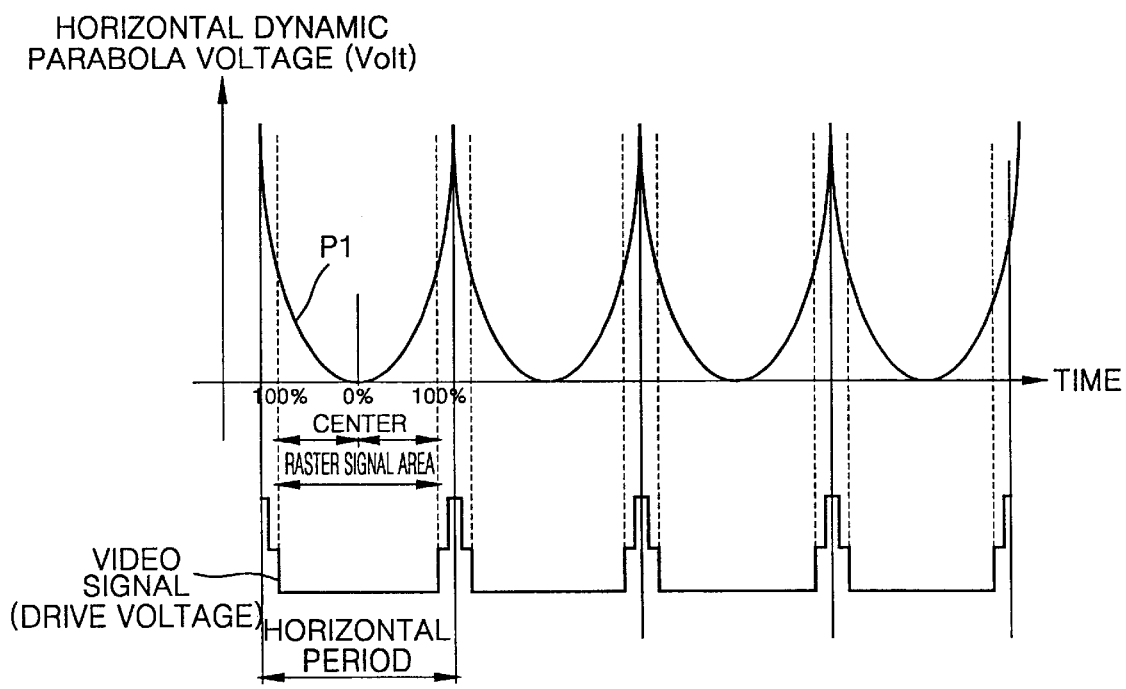
FIG. 5 is a graph showing a waveform of a horizontal dynamic parabola voltage applied to a quadrupole lens of the electron beam and a video signal.
Figure 6:
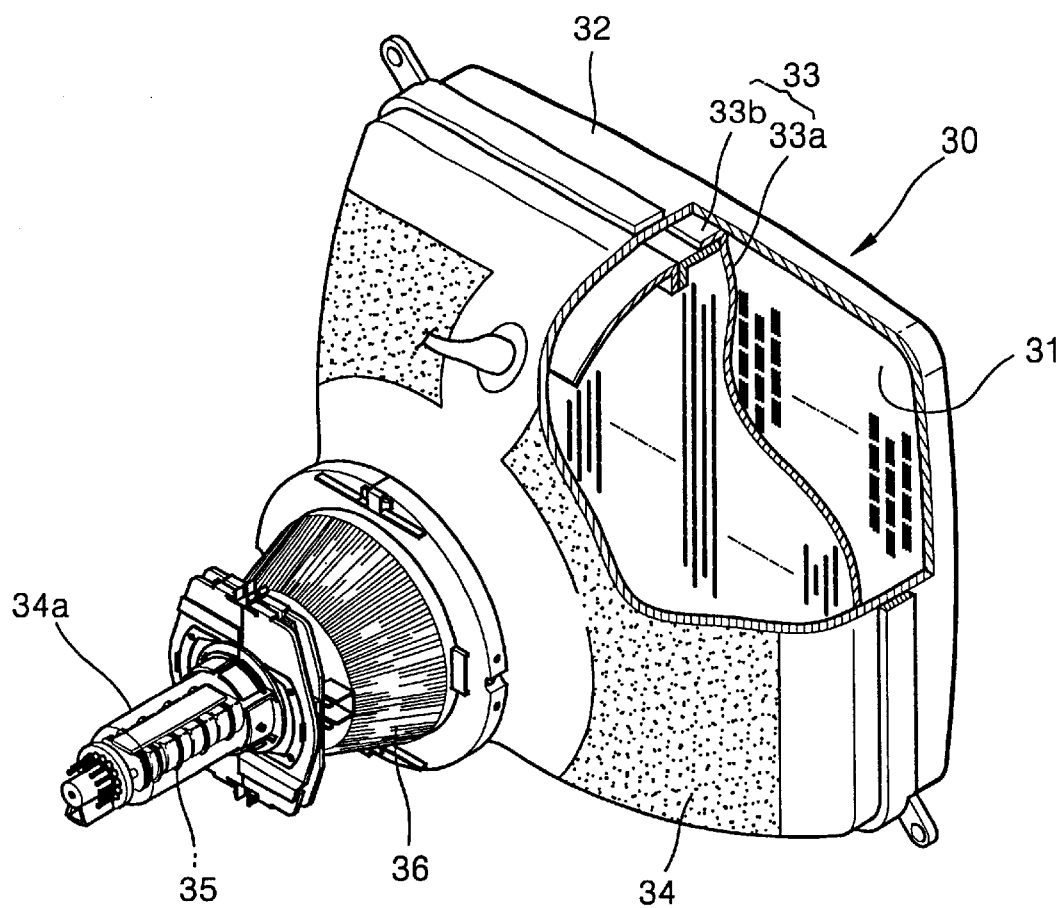
FIG. 6 is a perspective view of a color CRT according to the present invention.

FIG. 6 shows a color CRT according to a preferred embodiment of the present invention. As shown in the drawing, a color CRT 30 according to a preferred embodiment of the present invention includes a panel 32 where red, green and blue fluorescent substances 31 are formed on an inner surface of the panel 32 in a predetermined pattern, that is, a stripe or dot type patten, a shadow mask frame assembly 33 formed of a shadow mask 33a installed in the panel 32 and having a color selection function and a frame 33b supporting the shadow mask 33a, and a funnel 34 sealed to the panel 32 and having a neck portion 34a. An electron gun 35 for emitting an electron beam is installed in the neck portion 34 of the funnel 34. The electron gun 35 includes a plurality of electrodes for forming a cathode, focusing lenses, and a quadrupole lens. A deflection yoke 36 for deflecting an electron beam emitted from the electron gun 35 and having a deflection angle of the electron beam of 110° or more, is installed throughout the neck portion 34a and a cone portion of the funnel 34.

In the color CRT 30 having the above structure, the electron beam emitted from the cathode is focused and accelerated by the focusing lenses and the quadrupole lens and deflected by the deflection yoke 36 and land on a fluorescent film.

In the above process, since the deflection angle of the deflection yoke 36 in the color CRT is 110° or more, the deflection angle increases rapidly after passing a unilateral area of 50% of a raster area of a screen to which a video signal is applied. In particular, when a screen has a 16:9 size, such a phenomenon is severe. In this case, although the profile of the electron beam distorted by a deflection magnetic field is corrected while it passes through the quadrupole lens formed by the electrodes, distortion is generated to an electron beam landing on the peripheral portion of a screen by the shape of the waveform of the voltage so that a sufficient resolution cannot be obtained on the overall screen.

Figure 7:
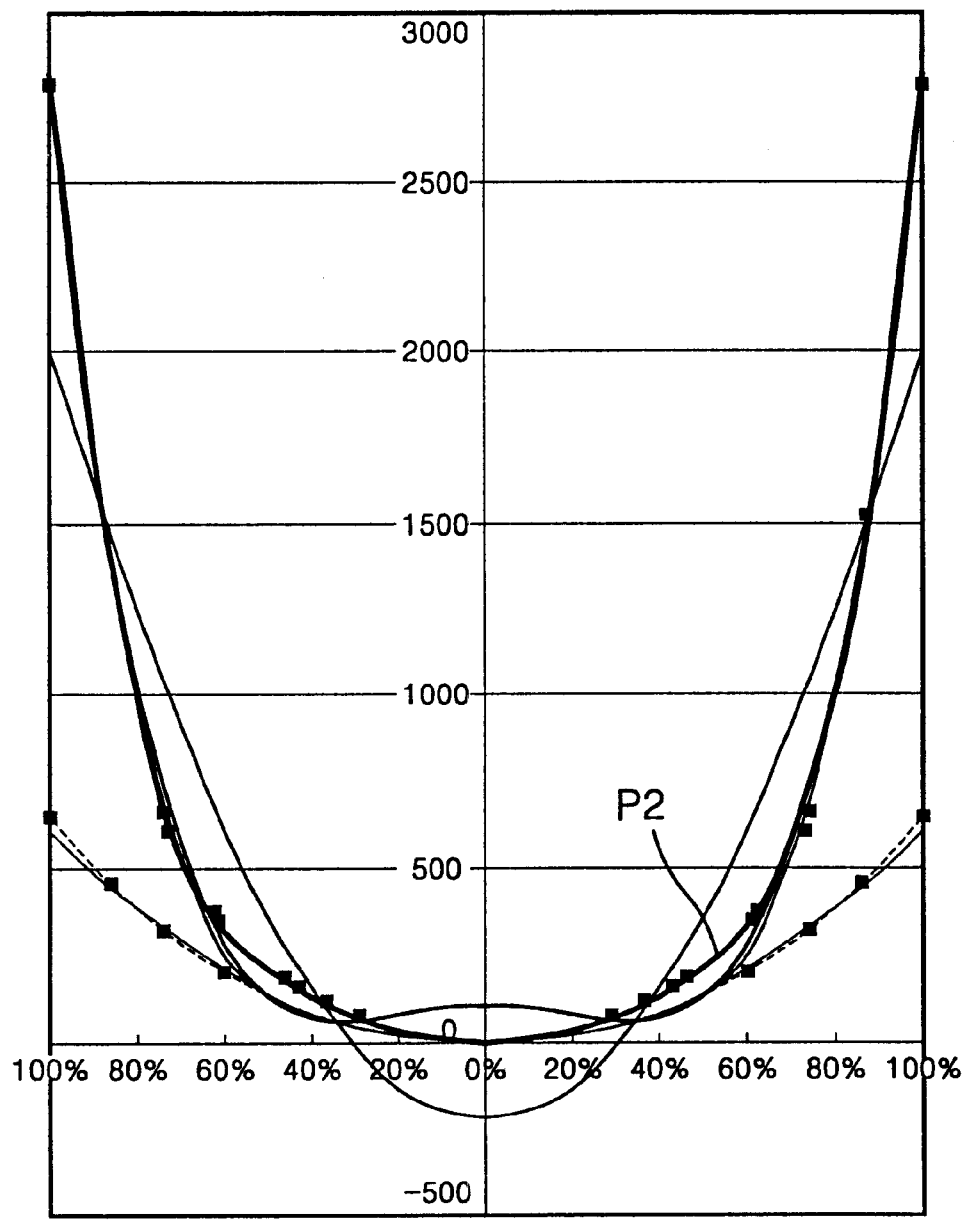
FIG. 7 is a graph showing the horizontal dynamic parabola voltage synchronized with a horizontal defection signal is fitted into various polynomials.
Figure 17:
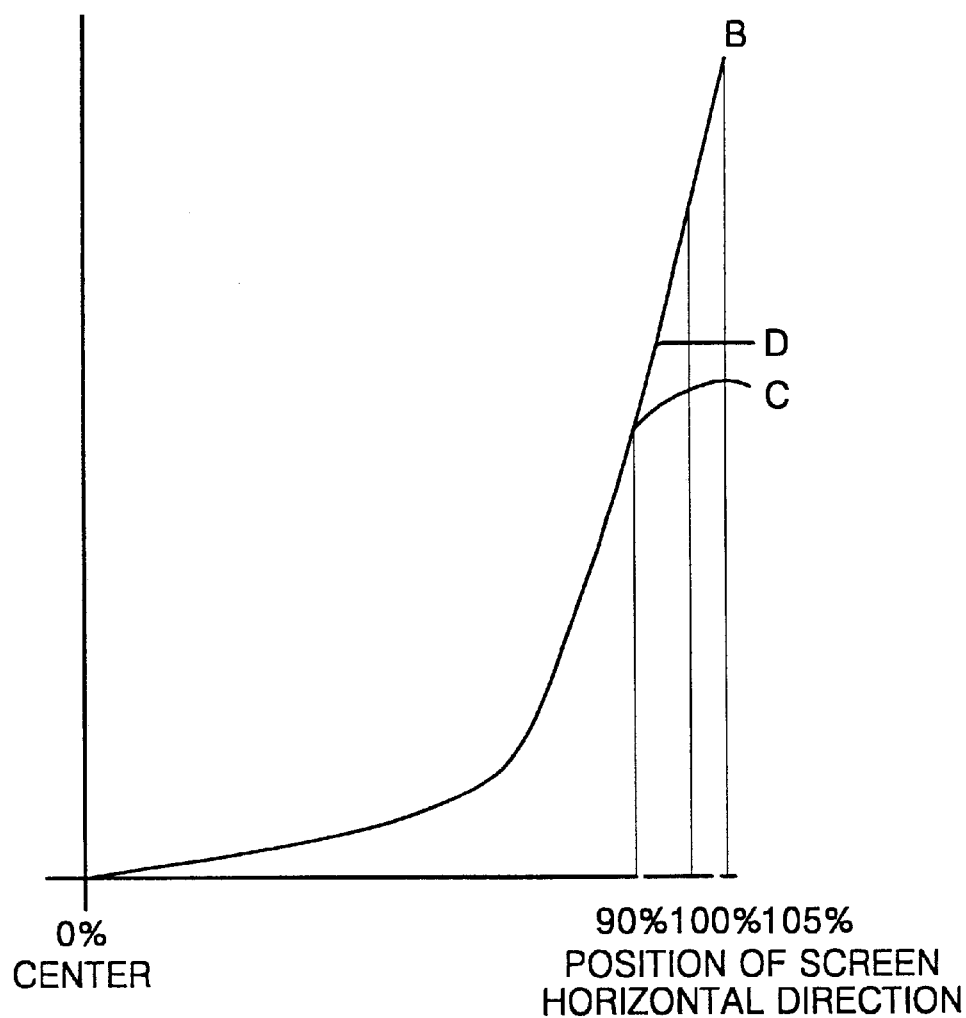
FIG. 17 is a graph showing another relationship between the position of a horizontal screen and a dynamic voltage.

To correct the distortion of the electron beam, as shown in FIG. 7, in the state in which the period of a waveform of a horizontal deflection voltage in a raster area applied to a video signal of an image, a horizontal dynamic voltage waveform P2 having a ratio of 6.85 or more between slopes in a unilateral area of 90% and a unilateral area of 50% is applied to at least one of the electrodes forming the quadrupole lens of the electron gun 35 by synchronizing a deflection signal and a horizontal deflection voltage and the vertical deflection voltage with the deflection yoke 36. As shown in FIG. 17, to prevent an increase in the voltage at the outer portion of the raster area of the CRT, it is preferred to apply a voltage having a waveform (C in FIG. 17) in which the inclination of the applied voltage in an area over the unilateral area of 90% of the waveform period decreases or a waveform (D in FIG. 17) in which the peak point portion is truncated at the end of the screen in which the voltage is the highest.

In the above CRT having a wide deflection angle, the density of a pincushion magnetic field increases rapidly when an electron beam is deflected in a horizontal direction. Thus, when the electron beam is deflected toward the peripheral portion of the screen surface, the electron beam received a sharp deflection distortion. As a result, when the electron beam is deflected toward the peripheral portion of a fluorescent film, the profile of the electron beam is vertically elongated. Since the waveform of the dynamic voltage applied to the quadrupole lens and a main lens to increase the length of focusing can make the deflection distortion of the profile of an electron beam at the peripheral portion of a screen due to the wide deflection angle corrected by a rapid increase of the dynamic voltage at the peripheral portion.

In detail, since a dynamic focus voltage synchronized with a deflection signal is applied to at least one electrode forming the quadrupole lens in the electron gun 35, the dynamic focus voltage applied is high as the electron beam goes toward the peripheral portion of the screen. When the electron beam is deflected toward the peripheral portion, deflection astigmatism by the deflection yoke for focusing the electron beam in a vertical direction and diverging the same in a horizontal direction by an effect by the pincushion magnetic field by the deflection yoke, is generated to the electron beam. As the wide deflection angle of a CRT increases and the CRT is made to have a flatter surface, the amount of the deflection astigmatism sharply increases so that the electron beam is severely distorted. A focus deterioration phenomenon is generated to the electron beam defected by the deflection yoke. A dynamic electron gun is used to compensate for the deterioration phenomenon in the electron gun. An improved design of the quadrupole lens is needed to prevent an excess increase of a voltage. The lens for horizontal focusing and vertical divergence of the quadrupole lens is intensified to vertically elongate the electron beam and lengthen the length of focus. Thus, an optimal focusing is made at the peripheral portion of a screen with respect to a change of a lower voltage.

However, although at a low voltage, a distortion phenomenon of an electron beam generated as the electron beam is deflected by the deflection yoke causes a rapid distortion of the beam. Thus, by applying an appropriate dynamic parabola voltage to the electrode forming the quadrupole lens of an electron gun, a uniform resolution can be obtained over the entire screen.

In a CRT having a wide deflection angle of 110° or more, since the deflection angle is not relatively great in a screen area between a point 0% of the raster pattern (the central portion of the screen) and a unilateral area of 50%, a rate of increase of a vertical deflection dynamic voltage makes a smooth voltage waveform (please refer to P2 of FIG. 7). In the case of being out of the unilateral area of 50% at the peripheral portion of a screen, deformation of the profile of the electron beam is generated by the deflection magnetic field to make the ratio between slopes in the unilateral area of 90% and the unilateral area of 50% to be 6.85. Thus, by applying a dynamic parabola voltage waveform corresponding to the above deformation to the quadrupole lens of the electron gun, a high resolution can be obtained over the entire screen. Also, like a waveform C of FIG. 17, application of a voltage waveform in which the inclination of a voltage decreases over 90% of the screen may prevent deterioration of reliability in the high pressure circuit due to a rapid increase of voltage in an area other then the screen.

The above-described function and effect will be clarified by the following experiments performed by the present inventor.

EXPERIMENT EXAMPLE 1

Figure 8:
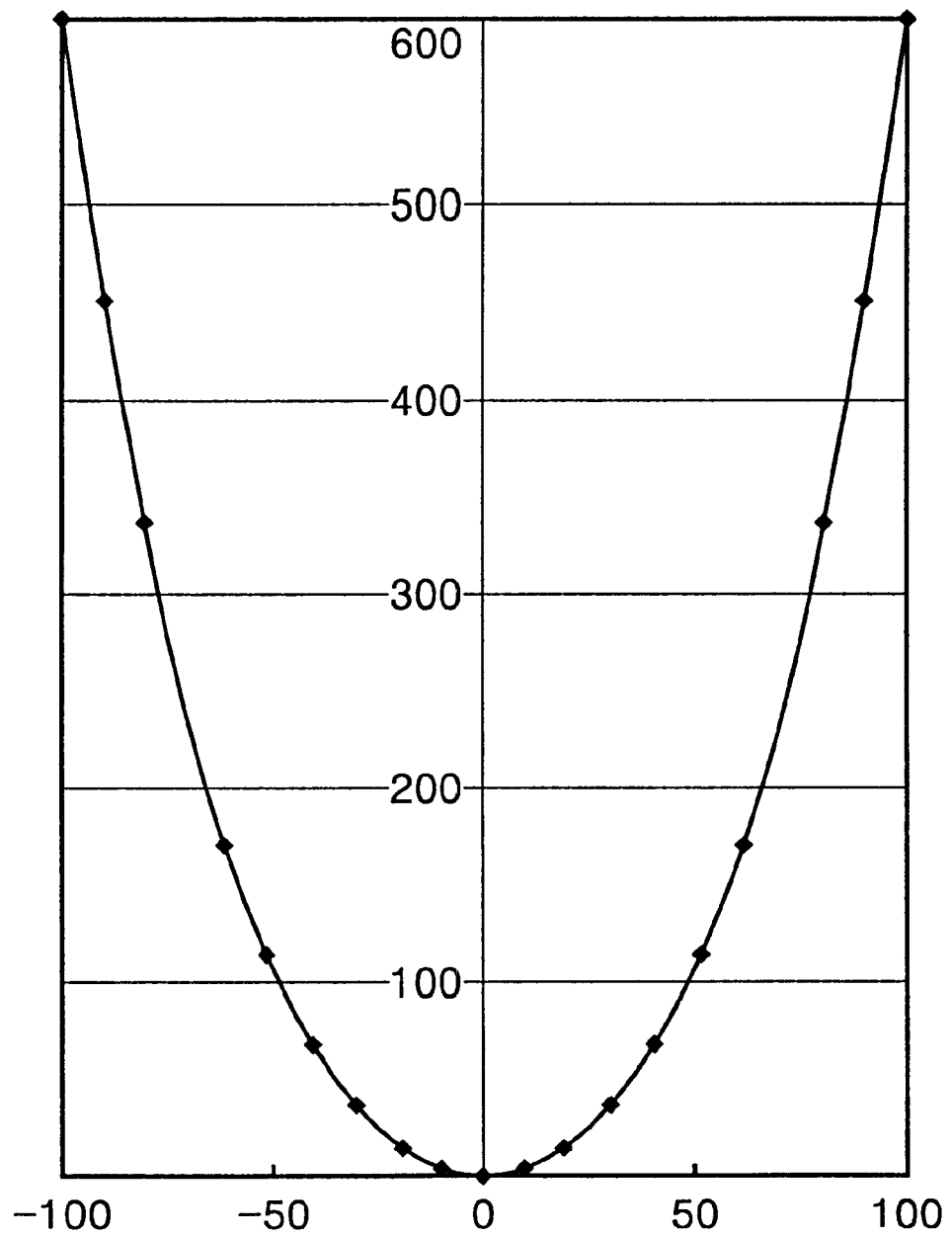
FIG. 8 is a graph showing the shape of a conventional dynamic parabola voltage.
Figure 9:
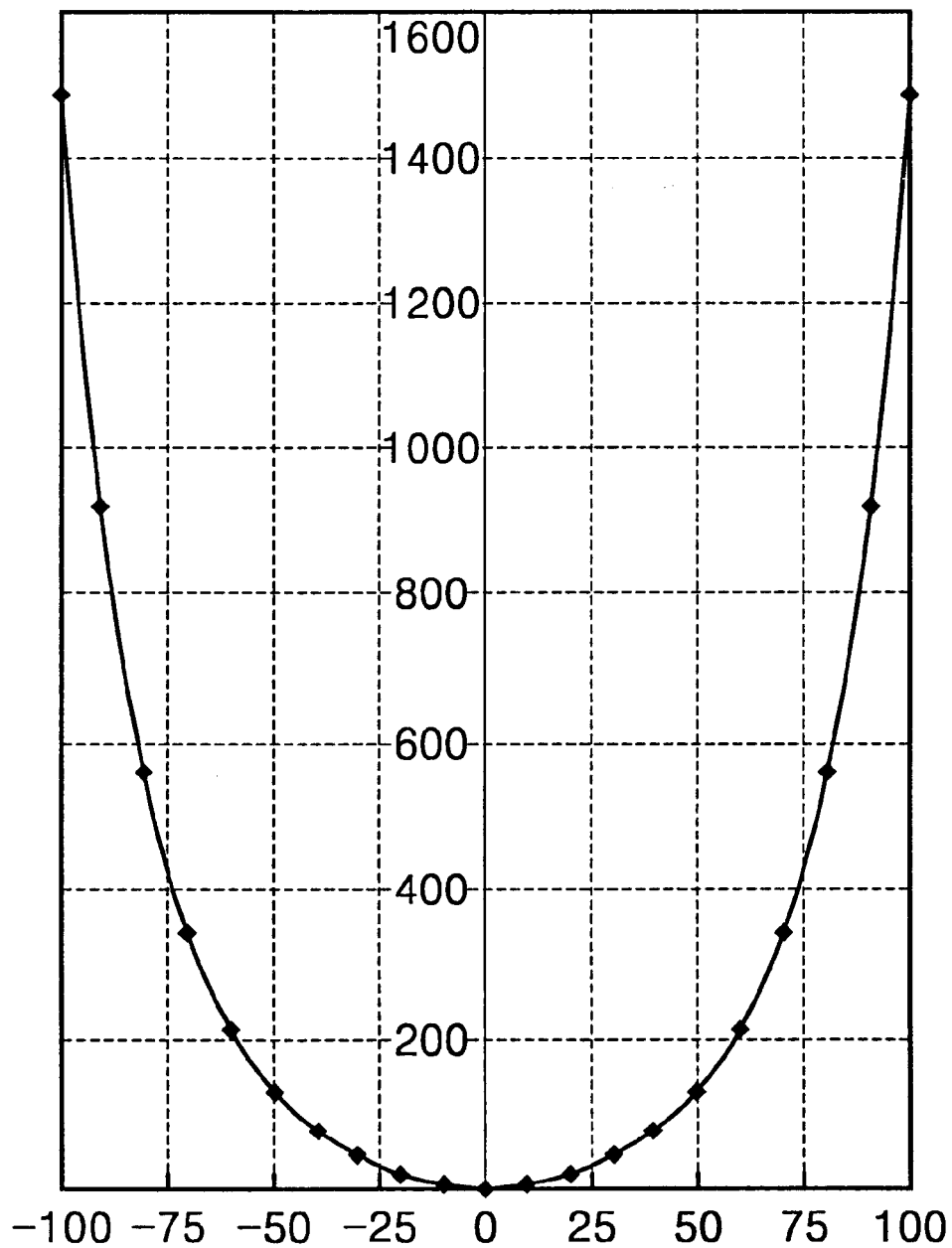
FIGS. 9 and 10 are views showing the horizontal dynamic parabola voltage of the present invention which is synchronized with the horizontal deflection signal.
Figure 10:
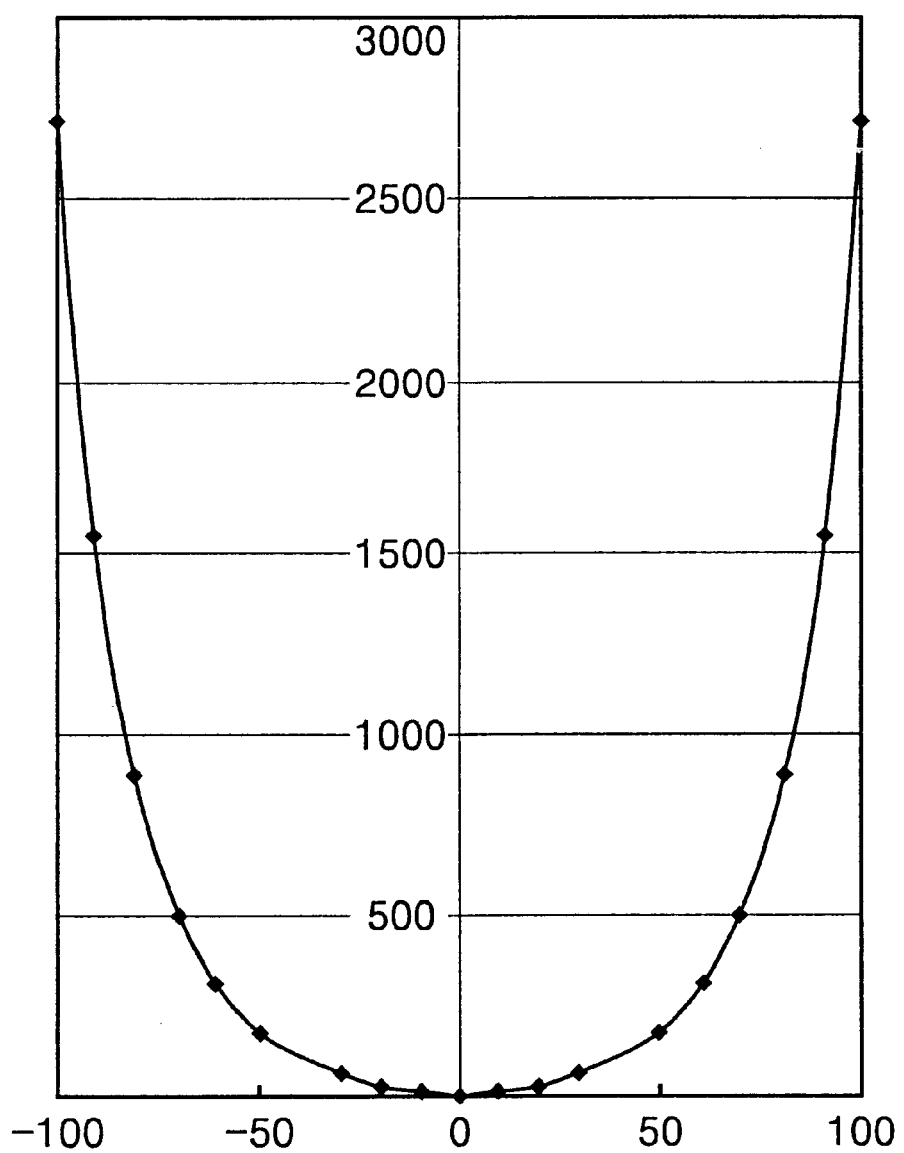
Figure 11A:
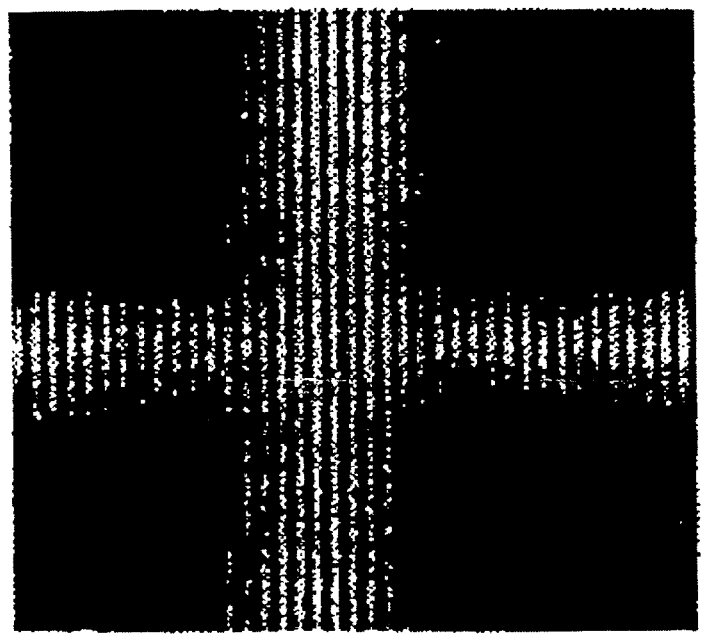
FIGS. 11A through 11D and 12A through 12D are photographs showing the state in which an electron beam lands on a fluorescent film according to the waveform of the deflection signal.
Figure 11B:
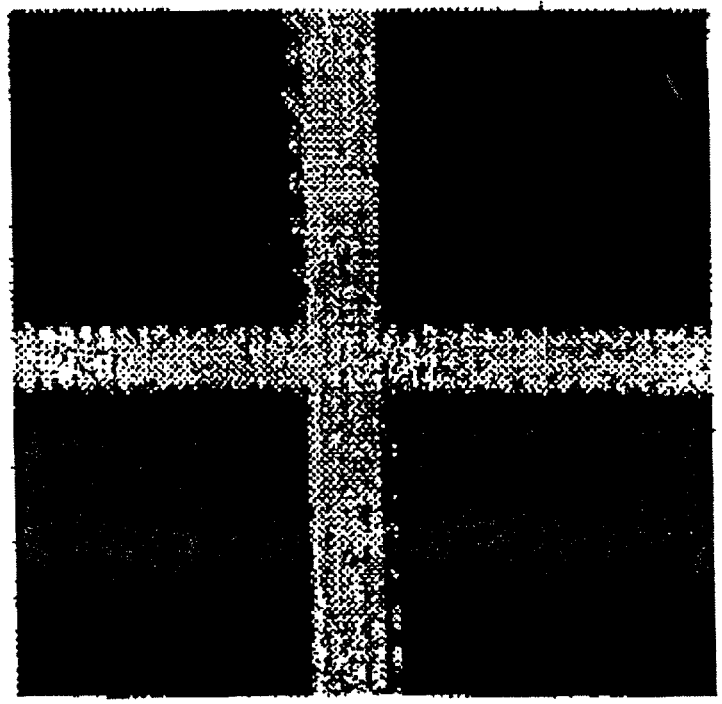
Figure 11C:
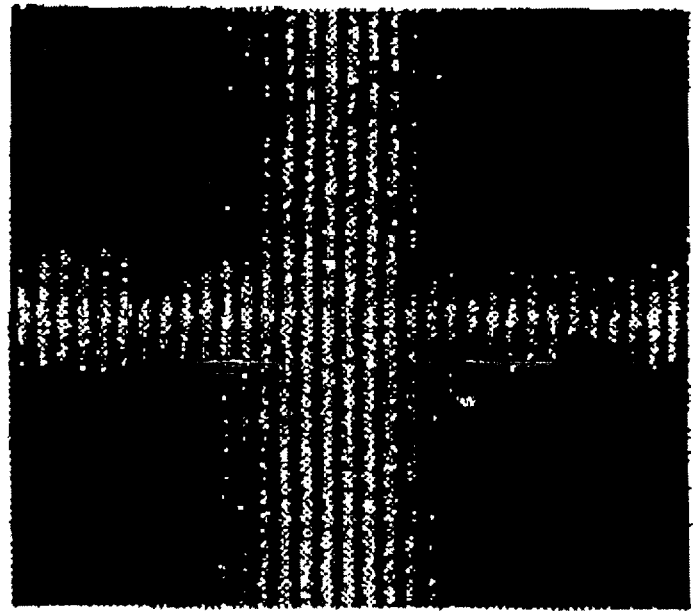
Figure 11D:
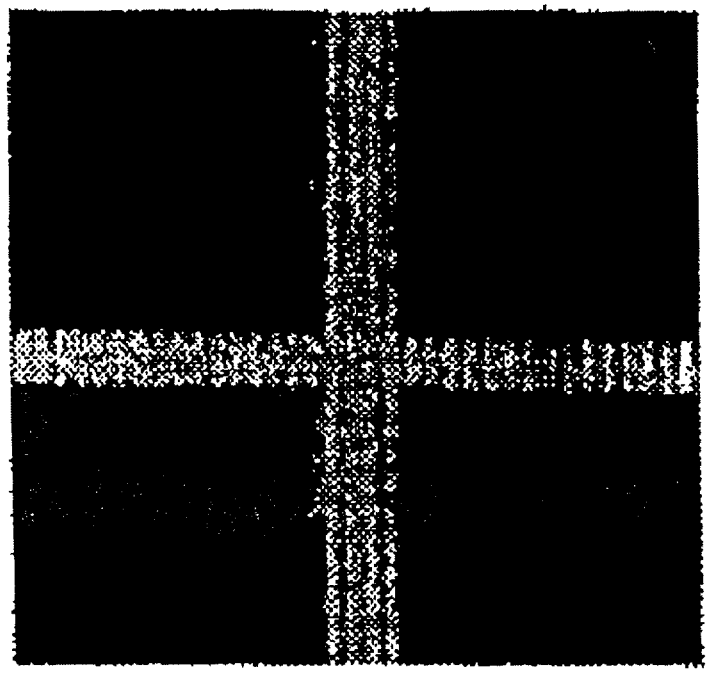
Figure 12A:
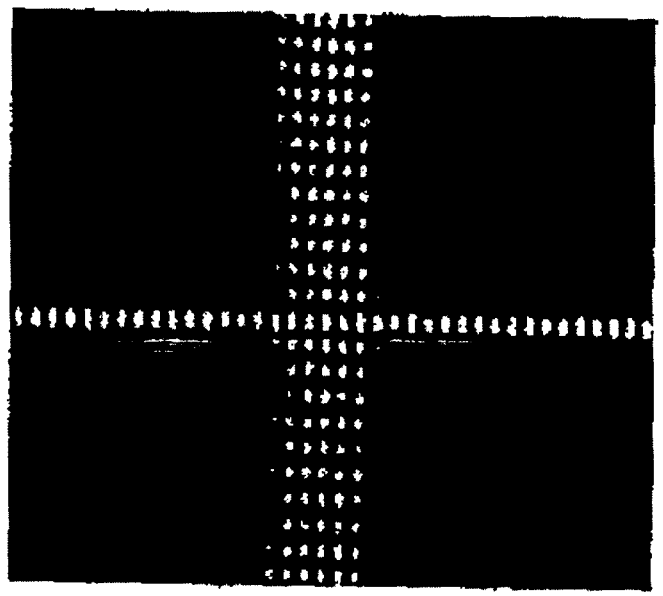
Figure 12B:
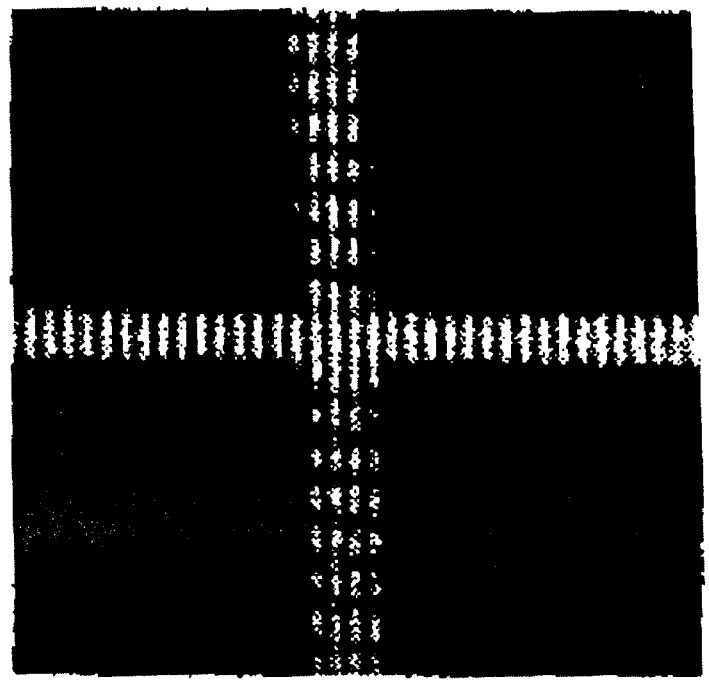
Figure 12C:
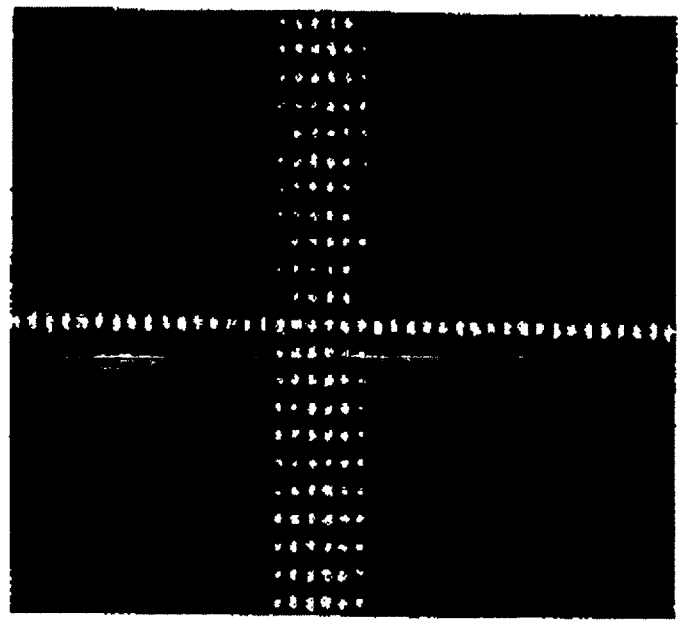
Figure 12D:
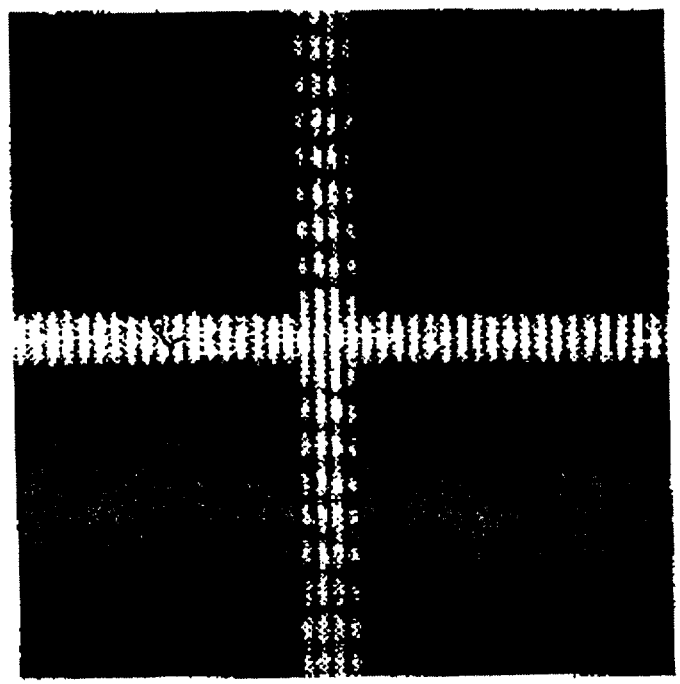

In this experiment, the waveform shape of a horizontal deflection voltage of each of color CRTs having deflection angles of 102°, 110° and 116° is obtained through simulation (waveform of a voltage obtained by fitting in a quartic equation and a sextic equation), the results of which are shown in graphs of FIGS. 8 through 10 and the following Table 1.

TABLE 1

| Screen (%) | Voltage value (V) | | | Screen (%) | Slope | | |
|---|---|---|---|---|---|---|---|
| | 116° | 110° | 102° | | 116° | 110° | 102° |
| 0 | 0 | 0 | 0 | 0 | 0.0 | 0.0 | 0.0 |
| 25 | 42.4 | 27 | 26 | 25 | 3.3 | 2.3 | 2.1 |
| 50 | 180.9 | 129 | 113 | 50 | 9.2 | 6.6 | 5.0 |
| 90 | 1711 | 919 | 455 | 90 | 98.7 | 44.3 | 13.0 |
| 100 | 3011 | 1480 | 600 | 100 | 166.2 | 69.6 | 16.0 |
| 90/50 | 9.46 | 7.14 | 4.05 | | 1.80 | 10.68 | 6.73 | 2.61 |

TABLE 1-continued

| Screen (%) | Voltage value (V) | | | Screen (%) | Slope | | |
|---|---|---|---|---|---|---|---|
| | 116° | 110° | 102° | | 116° | 110° | 102° |
| 90/50 | 40.3 | 33.4 | 17.7 | 3.6 | 30.0 | 19.5 | 6.1 | in Table 1, 116°, 110° and 102° denote deflection angles and the percentage (%) of a screen is determined by setting the period of a horizontal dynamic parabola waveform in a raster area to which a video signal of an image is applied as 100% with respect to the center of the screen.

As can be seen from the above table and graphs, a difference is not much in a dynamic parabola voltage applied to the electrode forming a quadrupole lens of an electron gun because a difference in slope applied to the central portion and the peripheral portion of a visual screen is not much in the case of a deflection angle of 102° having a ratio of slopes of 2.61 in the unilateral area of 90% of the raster signal and a unilateral area of 50% of the screen.

However, when the deflection angle is over 110°, the value of the slope increases gradually until the unilateral area of 50% from the central portion of the screen and steeply after the unilateral area of 50%. Thus, the voltage waveform has a horizontal dynamic waveform having a gradual slope as shown in FIG. 8, the state of distortion of an electron beam at the corner portions of a raster pattern, that is, at corner portions and both lateral sides of a screen, is severe as shown in FIGS. 11A through 11D so that focusing of the electron beam is not performed accurately.

When the horizontal deflection voltage waveform has a slope of at least 6.73 or more and the deflection angle of the electron beam is made great as shown in FIGS. 8 and 9, it can be seen that the distortion of the electron beam at the central portion and the peripheral portion of the electron beam is corrected and a focusing property is improved as shown in FIGS. 12A through 12D.

Figure 13:
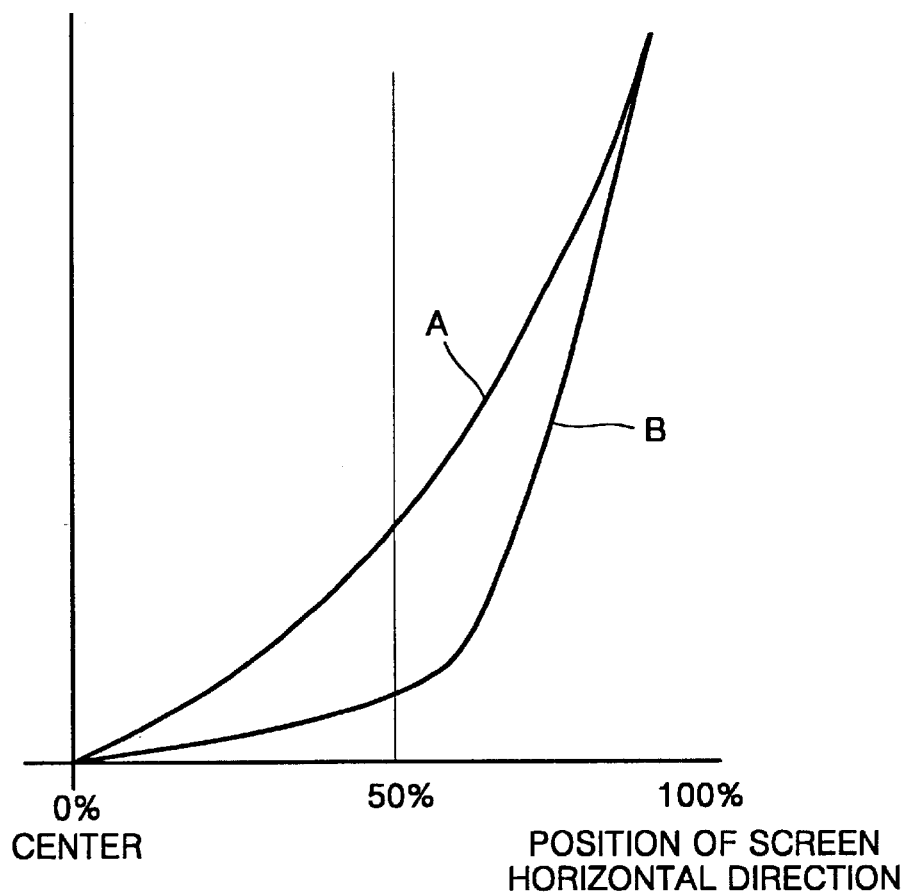
FIG. 13 is a graph showing the relationship of the dynamic focus voltage and the position of the electron beam landing on a screen.
Figure 14:
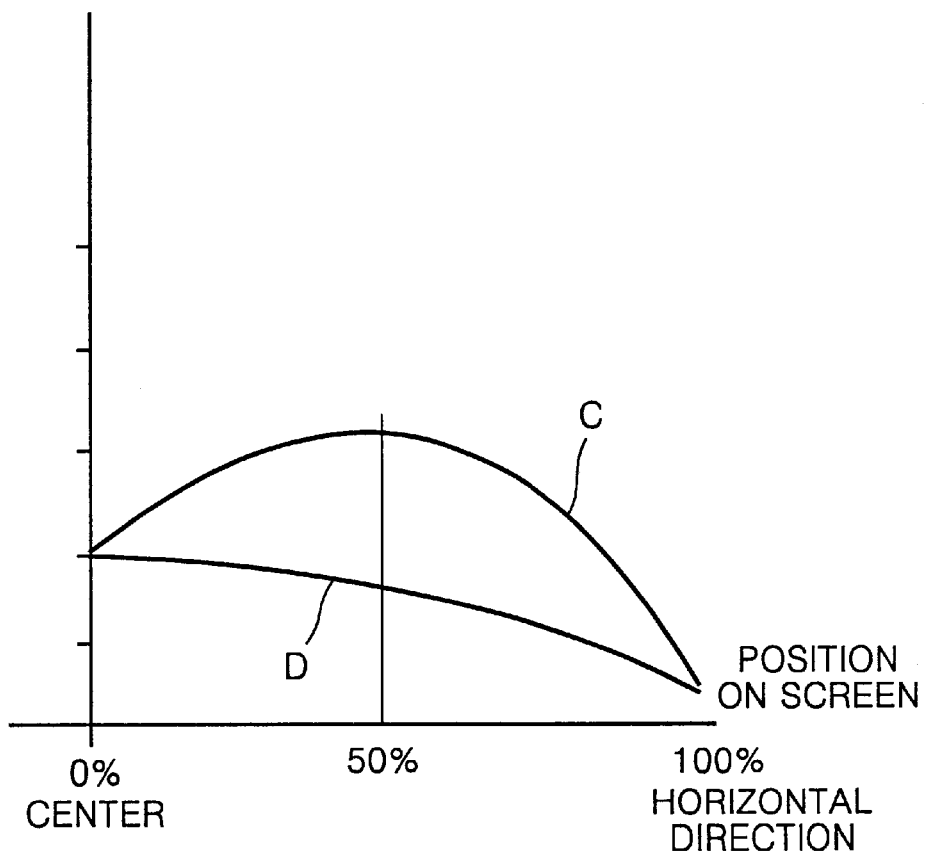
FIG. 14 is a graph showing the relationship of the diameter of an electron beam and the position of the electron beam landing on the screen surface.
Figure 15A:
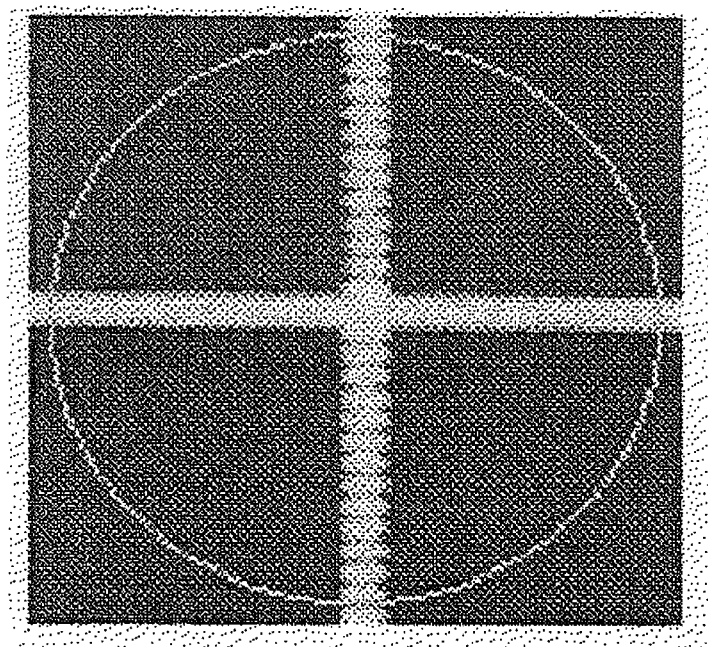
FIGS. 15A through 15C are photographs and a view showing an electron beam shown in a screen when the conventional dynamic parabola voltage is applied.
Figure 15B:
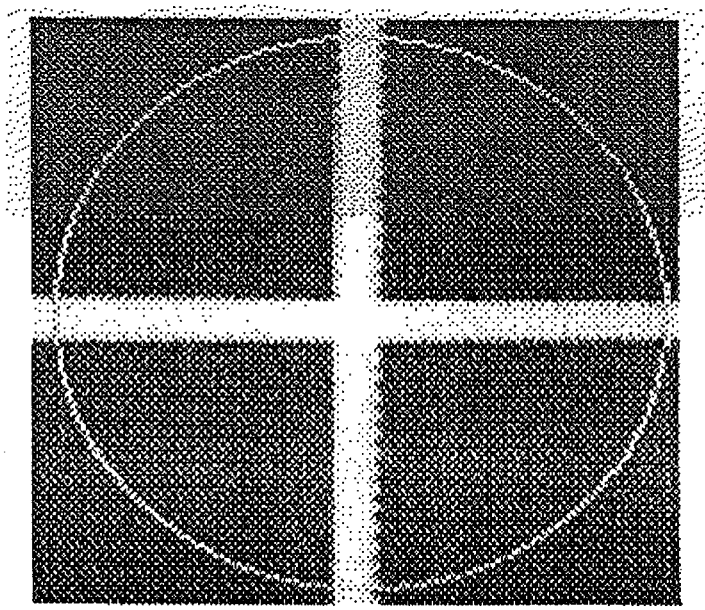
Figure 15C:
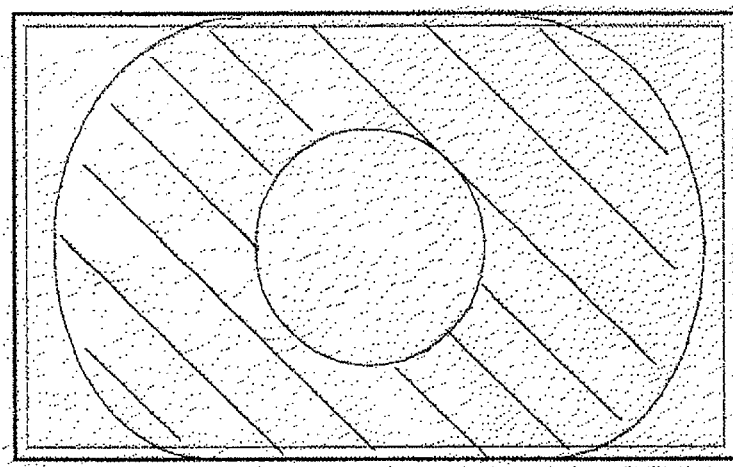
Figure 16A:
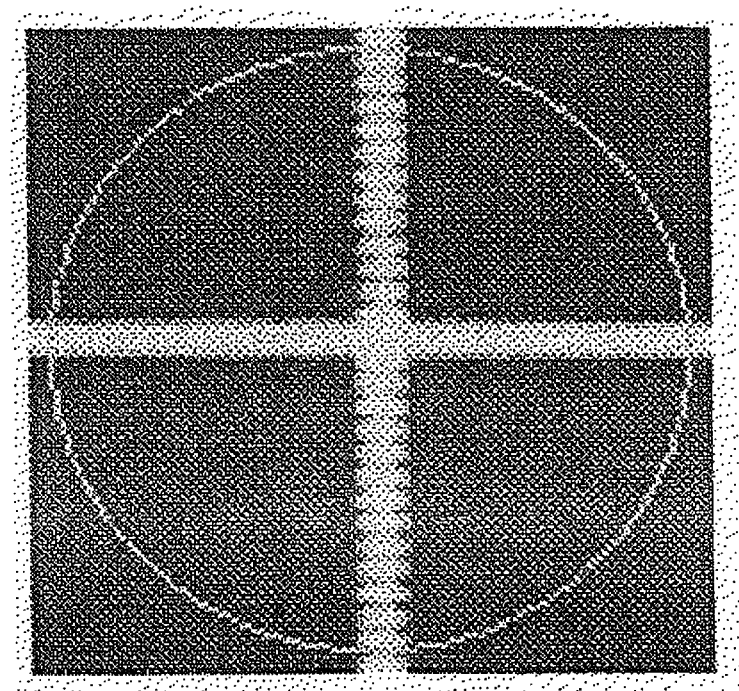
FIGS. 16A and 16B are photographs showing the electron beam focused on the screen according to the present invention.
Figure 16B:
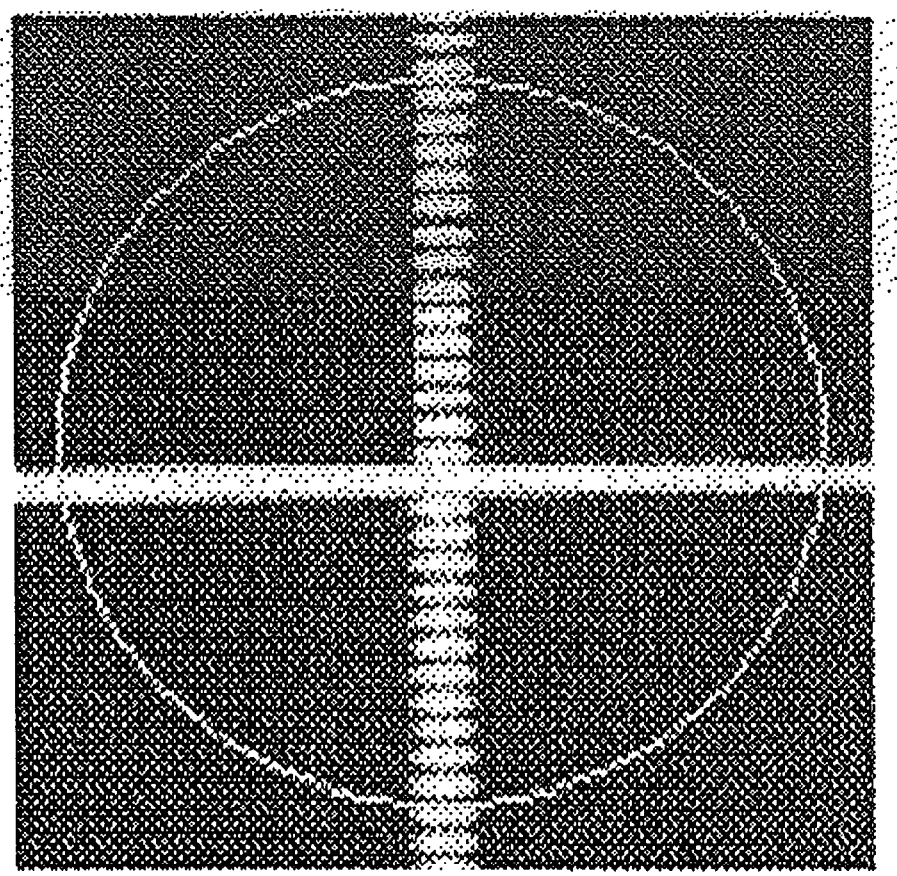

As shown in FIGS. 13 through 14, by making the dynamic parabola voltage applied to the electrode forming the quadrupole lens of the electron gun increase steeply in an unilateral area between 50% through 90% of the raster signal area, compared to the conventional dynamic focus voltage (please refer to a curve A of FIG. 13), the amount of the electron beam at each of positions between the central portion and the peripheral portion on a screen according to the present invention (please refer to a curve D of FIG. 14, FIG. 16A and FIG. 16B) is drastically reduces compared to the amount of the electron beam at each position when the conventional dynamic focus voltage is applied (please refer to a curve D of FIG. 14, FIG. 15A, FIG. 15B, and FIG. 15C). As a result, it can be seen that resolution of the overall screen can be increased.

As described above, according to the color CRT and the driving method of the same according to the present invention, the distortion of an electron beam due to the deflection magnetic field and the overall length of the CRT which becomes severe as the deflection angle of the electron beam increases can be basically prevented. Further, resolution of a screen can be improved.

It is noted that the present invention is not limited to the preferred embodiment described above, and it is apparent that variations and modifications by those skilled in the art can be effected within the spirit and scope of the present invention defined in the appended claims.

What is claimed is:

1. A color cathode ray tube (CRT) comprising:
   a panel having a screen surface including a fluorescent film in a pattern;
   a funnel sealed to the panel;
   an electron gun installed in a neck portion of the funnel and having electrodes for forming at least one quadrupole lens; and
   a deflection yoke installed throughout the neck portion and a cone portion of the CRT, and a dynamic voltage waveform having a ratio of slopes of at least 6.85 between a unilateral area of 90% and a unilateral area of 50% of a raster area to which a video signal of an image is applied, is applied to at least one electrode of the quadrupole lens.

2. The color CRT as claimed in claim 1, wherein the inclination of a voltage relatively decreases in the unilateral area of at least 90% of the raster area to which a video signal of an image is applied.

3. A method of driving a color cathode ray tube (CRT) comprising:
   focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;
   focusing the electron beam on a fluorescent film by applying a voltage having a horizontal dynamic waveform having a ratio of slopes of at least 6.85 between a unilateral area of 90% and a unilateral area of 50% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and
   forming an image when the deflected electron beam lands on the fluorescent film and excites the fluorescent film.

4. The method as claimed in claim 3, including applying a voltage in which the inclination of a horizontal dynamic waveform relatively decreases in the unilateral area of at least 90% of the raster area and to which a video signal of an image is applied.

5. A method of driving a color cathode ray tube (CRT) comprising:
   focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;
   focusing the electron beam on a fluorescent film by applying a voltage having a horizontal dynamic waveform having a ratio of voltages of at least 7.14 between a unilateral area of 90% and a unilateral area of 50% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and
   forming an image when the deflected electron beam lands on the fluorescent film and excites the fluorescent film.

6. The method as claimed in claim 5, including applying a voltage in which the inclination of a horizontal dynamic waveform relatively decreases in the unilateral area of at least 90% of the raster area and to which a video signal of an image is applied.

7. A method of driving a color cathode ray tube (CRT) comprising:
   focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;
   focusing the electron beam on a fluorescent film by applying a voltage having a horizontal dynamic waveform having a ratio of voltages of at least 33.4 between a unilateral area of 90% and a unilateral area of 25% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and
   forming an image when the deflected electron beam lands on the fluorescent film and excites the fluorescent film.

8. The method as claimed in claim 7, including applying a voltage in which the inclination of a horizontal dynamic waveform relatively decreases in the unilateral area of at least 90% of the raster area and to which a video signal of an image is applied.

9. A method of driving a color cathode ray tube (CRT) comprising:
   focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;
   focusing the electron beam on a fluorescent film by applying a voltage having a horizontal dynamic waveform having a ratio of voltages of at least 4.78 between a unilateral area of 50% and a unilateral area of 25% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and
   forming an image when the deflected electron beam lands on the fluorescent film and excites the fluorescent film.

10. The method as claimed in claim 9, including applying a voltage in which the inclination of a horizontal dynamic waveform relatively decreases in the unilateral area of at least 90% of the raster area and to which a video signal of an image is applied.

11. A method of driving a color cathode ray tube (CRT) comprising:
    focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;

focusing the electron beam on a fluorescent film by applying a voltage having a horizontal dynamic waveform having a ratio of slopes of at least 19.5 between a unilateral area of 90% and a unilateral area of 25% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and forming an image when the deflected electron beam lands on the fluorescent film and excites the fluorescent film.

12. The method as claimed in claim 11, including applying a voltage in which the inclination of a horizontal dynamic waveform relatively decreases in the unilateral area of at least 90% of the raster area and to which a video signal of an image is applied.

13. A method of driving a color cathode ray tube (CRT) comprising:

focusing and accelerating an electron beam emitted from a cathode with a plurality of electron lenses including a quadrupole lens by applying a voltage to the cathode of an electron gun installed in a neck portion of a funnel of the CRT and each of electrodes of the plurality of electron lenses;

focusing the electron beam on a fluorescent film by applying a voltage having a horizontal dynamic waveform having a ratio of slopes of at least 2.87 between a unilateral area of 90% and a unilateral area of 25% of a raster area and to which a video signal of an image is applied, to at least one of the electrodes forming the quadrupole lens, the voltage being synchronized with a horizontal deflection signal applied to a deflection yoke installed at a cone portion of the funnel, in order to deflect an electron beam emitted from the electron gun and scan the deflected electron beam onto the fluorescent film of a panel sealed to the funnel; and forming an image when the deflected electron beam lands on the fluorescent film and excites the fluorescent film.

14. The method as claimed in claim 13, including applying a voltage in which the inclination of a horizontal dynamic waveform relatively decreases in the unilateral area of at least 90% of the raster area and to which a video signal of an image is applied.

* * * * *